US008255808B2

(12) United States Patent
Lindgren et al.

(10) Patent No.: US 8,255,808 B2
(45) Date of Patent: Aug. 28, 2012

(54) CONTROLLING DATA TRANSFER BETWEEN DEVICES

(75) Inventors: Marko Juha Sakari Lindgren, Espoo (FI); Toni Matti Virhiä, Helsinki (FI); Miika Erik Tams, Helsinki (FI); Sami Esa Juhani Niemelä, Espoo (FI); Jarkko Ojanen, Helsinki (FI); Miia Johanna Heikki, Kempele (FI); Pasi Pekka Matilainen, Helsinki (FI); Pekka Antero Palmu, Helsinki (FI); Taneli Ville Henrikki Tikkanen, Helsinki (FI); Andreas Oliver Szurawitzki, Helsinki (FI); Niko Kasperi Rintala, Porvoo (FI); Olli Johannes Sinerma, Espoo (FI); Henrik Mikael Söderqvist, Helsinki (FI)

(73) Assignee: Nokia Corporation, Espoo (FI)

( * ) Notice: Subject to any disclaimer, the term of this patent is extended or adjusted under 35 U.S.C. 154(b) by 569 days.

(21) Appl. No.: 12/316,486

(22) Filed: Dec. 12, 2008

(65) Prior Publication Data

US 2010/0153878 A1    Jun. 17, 2010

(51) Int. Cl.
*G06F 13/00* (2006.01)
*G06F 3/048* (2006.01)
*G06F 17/30* (2006.01)
*G06F 13/14* (2006.01)
*G06F 13/38* (2006.01)

(52) U.S. Cl. ........ 715/748; 715/737; 715/810; 715/825; 715/864; 709/248

(58) Field of Classification Search .................. 709/248, 709/E17.009; 715/716, 733, 735, 736, 740, 715/748, 788, 792, 810
See application file for complete search history.

(56) References Cited

U.S. PATENT DOCUMENTS

| 2002/0188726 | A1   | 12/2002 | Schick et al.            |
|--------------|------|---------|--------------------------|
| 2003/0106068 | A1*  | 6/2003  | Ishida et al. ... 725/134 |
| 2003/0163622 | A1*  | 8/2003  | Moran ... 710/74         |
| 2003/0222913 | A1   | 12/2003 | Mattila et al.           |
| 2004/0008224 | A1   | 1/2004  | Molander et al.          |
| 2004/0064575 | A1*  | 4/2004  | Rasheed et al. ... 709/232 |
| 2004/0128361 | A1*  | 7/2004  | Gaffney ... 709/217      |
| 2005/0281185 | A1*  | 12/2005 | Kawasaki ... 369/275.3   |
| 2005/0289235 | A1*  | 12/2005 | Suematsu et al. ... 709/230 |
| 2007/0157100 | A1*  | 7/2007  | Wiggen ... 715/769       |

(Continued)

OTHER PUBLICATIONS

Apple—Mac OS X Leopard—Features—iSync Devices, "iSync. Sync with everything except the kitchen".
Apple—iPhoto—Faces, Places, and other new features, "What's new in iPhoto '09".

(Continued)

*Primary Examiner* — Kieu Vu
*Assistant Examiner* — Eric Bycer
(74) *Attorney, Agent, or Firm* — Alston & Bird LLP (57) ABSTRACT

An example apparatus is provided. The apparatus may include a display, a processor configured to control the display. The display may be controlled to present a first ordered list of graphical icons in a first portion of the display and a second ordered list of graphical icons in a second portion of the display. The display may also be controlled to present a user input configured to control transfer of a data type from a first storage device by changing the visual configuration of the graphical icons in the first ordered list of graphical icons that represent and indicate a particular data type and configured to control transfer of a data type by a second storage device by changing the visual configuration of the graphical icons in the second ordered list of graphical icons that represents and indicates that data type. Example methods are also provided.

18 Claims, 4 Drawing Sheets

U.S. PATENT DOCUMENTS

2008/0114844 A1    5/2008    Sanchez et al.

OTHER PUBLICATIONS

Apple—iTunes—The world's most popular digital media player, "iTunes Plus: High-quality music. Downloadable on Wi-Fi and cellular. All for the same price."

Partial International Search Report for International Application No. PCT/IB2009/055178 dated Mar. 23, 2010.
International Search Report and Written Opinion for International Application No. PCT/IB2009/055178 dated Jun. 7, 2010.

* cited by examiner

CONTROLLING DATA TRANSFER BETWEEN DEVICES

FIELD OF THE INVENTION

Embodiments of the present invention relate to controlling data transfer between two devices. In particular, they relate to apparatus, methods, computer programs and graphical user interfaces for controlling data transfer between devices.

BACKGROUND TO THE INVENTION

Many devices are now multi-functional and have the ability to acquire, store and use different data types. For example, a mobile cellular telephone may capture photos, capture video, download music, store contact information and calendar information. A computer may also store and/or use this data.

It may be possible to synchronize some data types between devices and manually copy other data types between devices.

It would be desirable to enable a user to better control the transfer of different data types between devices.

BRIEF DESCRIPTION OF VARIOUS EMBODIMENTS OF THE INVENTION

According to various embodiments of the invention there is provided an apparatus comprising: a display; a processor configured to control the display to display:
  a first ordered list of graphical icons in a first portion of the display wherein each graphical icon represents and indicates a different data type and wherein graphical icons are user configurable to have either a first visual configuration that indicates enabled transfer from a first storage device to a second storage device of the data type indicated by the icon or a second visual configuration that indicates disabled transfer from the first storage device of the data type indicated by the icon;
  a second ordered list of graphical icons in a second portion of the display wherein each graphical icon represents and indicates a different data type and wherein graphical icons are user configurable to have either a first visual configuration that indicates enabled transfer from the second storage device to the first storage device of the data type indicated by the icon or a second visual configuration that indicates disabled transfer from the second storage device of the data type indicated by the icon;
  and wherein the second portion of the display is adjacent the first portion of the display, the ordering of the graphical icons in the first ordered list and the ordering of the graphical icons in the second ordered list are the same and the graphical icons of the first ordered list and of the second ordered list form pairs of graphical icons for different data types, wherein each pair of graphical icons includes a graphical icon from the first ordered list and a graphical icon from the second ordered list that represent and indicate the same data type; and
  a user input configured to control transfer of a data type from the first device by changing the visual configuration of the graphical icon in the first ordered list of graphical icons that represents and indicates that data type and configured to control transfer of a data type by the second device by changing the visual configuration of the graphical icon in the second ordered list of graphical icons that represents and indicates that data type.

According to various embodiments of the invention there is provided an apparatus comprising:
  display means for displaying:
  a first ordered list of graphical icons in a first portion of the display wherein each graphical icon represents and indicates a different data type and wherein graphical icons are user configurable to have either a first visual configuration that indicates enabled transfer from a first storage device to a second storage device of the data type indicated by the icon or a second visual configuration that indicates disabled transfer from the first storage device of the data type indicated by the icon;
  a second ordered list of graphical icons in a second portion of the display wherein each graphical icon represents and indicates a different data type and wherein graphical icons are user configurable to have either a first visual configuration that indicates enabled transfer from the second storage device to the first storage device of the data type indicated by the icon or a second visual configuration that indicates disabled transfer from the second storage device of the data type indicated by the icon;
  and wherein the second portion of the display is adjacent the first portion of the display, the ordering of the graphical icons in the first ordered list and the ordering of the graphical icons in the second ordered list are the same and the graphical icons of the first ordered list and of the second ordered list form pairs of graphical icons for different data types, wherein each pair of graphical icons includes a graphical icon from the first ordered list and a graphical icon from the second ordered list that represent and indicate the same data type; and
  user input means for controlling transfer of a data type from the first device by changing the visual configuration of the graphical icon in the first ordered list of graphical icons that represents and indicates that data type and configured to control transfer of a data type by the second device by changing the visual configuration of the graphical icon in the second ordered list of graphical icons that represents and indicates that data type.

According to various embodiments of the invention there is provided a method comprising:
  displaying in a first portion of the display, a first ordered list of graphical icons wherein each graphical icon represents and indicates a different data type and wherein graphical icons are user configurable to have either a first visual configuration that indicates enabled transfer from a first storage device to a second storage device of the data type indicated by the icon or a second visual configuration that indicates disabled transfer from the first storage device of the data type indicated by the icon;
  displaying, in a second portion of the display adjacent the first portion of the display, a second ordered list of graphical icons having the same ordering as the first ordered list of graphical icons wherein each graphical icon of the second ordered list represents and indicates a different data type and wherein graphical icons are user configurable to have either a first visual configuration that indicates enabled transfer from the second storage device to the first storage device of the data type indicated by the icon or a second visual configuration that indicates disabled transfer from the second storage device of the data type indicated by the icon, the graphical icons of the first ordered list and of the second ordered list forming pairs of graphical icons for different data types, wherein each pair of graphical icons includes a graphical icon from the first ordered list and a graphical icon from the second ordered list that represent and indicate the same data type;

enabling a user to change the visual configuration of the graphical icon in the first ordered list of graphical icons representing and indicating a first data type to control transfer of the first data type from the first device; and enabling a user to change the visual configuration of the graphical icon in the second ordered list of graphical icons representing and indicating a second data type to control transfer of the second data type from the second device.

According to various embodiments of the invention there is provided a computer readable medium tangibly embodying a program comprising instructions which when executed by a processor enables:

displaying, in a first portion of the display, a first ordered list of graphical icons wherein each graphical icon represents and indicates a different data type and wherein graphical icons are user configurable to have either a first visual configuration that indicates enabled transfer from a first storage device to a second storage device of the data type indicated by the icon or a second visual configuration that indicates disabled transfer from the first storage device of the data type indicated by the icon;

displaying, in a second portion of the display adjacent the first portion of the display, a second ordered list of graphical icons having the same ordering as the first ordered list of graphical icons wherein each graphical icon of the second ordered list represents and indicates a different data type and wherein graphical icons are user configurable to have either a first visual configuration that indicates enabled transfer from the second storage device to the first storage device of the data type indicated by the icon or a second visual configuration that indicates disabled transfer from the second storage device of the data type indicated by the icon, the graphical icons of the first ordered list and of the second ordered list forming pairs of graphical icons for different data types, wherein each pair of graphical icons includes a graphical icon from the first ordered list and a graphical icon from the second ordered list that represent and indicate the same data type;

enabling a user to change the visual configuration of the graphical icon in the first ordered list of graphical icons representing and indicating a first data type to control transfer of the first data type from the first device; and enabling a user to change the visual configuration of the graphical icon in the second ordered list of graphical icons representing and indicating a second data type to control transfer of the second data type from the second device.

According to various embodiments of the invention there is provided a graphical user interface comprising:

a first ordered list of graphical icons in a first portion of the display wherein each graphical icon represents and indicates a different data type and wherein graphical icons are user configurable to have either a first visual configuration that indicates enabled transfer from a first storage device to a second storage device of the data type indicated by the icon or a second visual configuration that indicates disabled transfer from the first storage device of the data type indicated by the icon;

a second ordered list of graphical icons in a second portion of the display wherein each graphical icon represents and indicates a different data type and wherein graphical icons are user configurable to have either a first visual configuration that indicates enabled transfer from the second storage device to the first storage device of the data type indicated by the icon or a second visual configuration that indicates disabled transfer from the second storage device of the data type indicated by the icon;

and wherein the second portion of the display is adjacent the first portion of the display, the ordering of the graphical icons in the first ordered list and the ordering of the graphical icons in the second ordered list are the same and the graphical icons of the first ordered list and of the second ordered list form pairs of graphical icons for different data types, wherein each pair of graphical icons includes a graphical icon from the first ordered list and a graphical icon from the second ordered list that represent and indicate the same data type; and a user input configured to control transfer of a data type from the first device by changing the visual configuration of the graphical icon in the first ordered list of graphical icons that represents and indicates that data type and configured to control transfer of a data type from the second device by changing the visual configuration of the graphical icon in the second ordered list of graphical icons that represents and indicates that data type.

According to various embodiments of the invention there is provided a method for controlling data transfer to and from a device comprising:

storing data of different data types;

storing a first data structure for the device wherein the first data structure indicates for each of a plurality of data types:
    details of data waiting for transfer from the device; and
    a transfer status that indicates whether the data type is transferred from the device;

storing a second data structure for a second data storage device wherein the second data structure indicates for each of a plurality of data types:
    details of data waiting for transfer from the second storage device; and
    a transfer status that indicates whether the data type is transferred from the second device;

updating the first data structure after storing additional data; and updating the second data structure by communicating with the second data storage device.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 3:
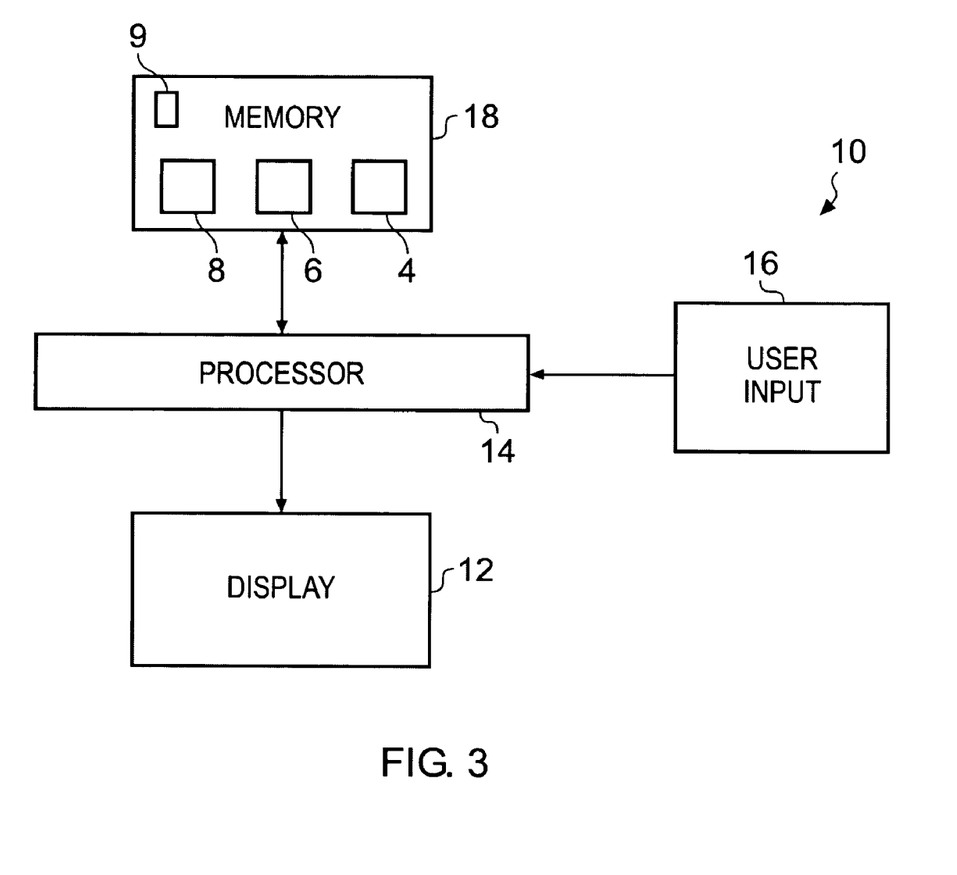
FIG. 3 schematically illustrates an apparatus 10 for controlling, via the graphical user interface, the transfer of data to and from the apparatus.

FIG. 3 schematically illustrates an apparatus 10 for controlling, via a graphical user interface 40 (FIG. 1), the transfer of data to and from the apparatus 10. The apparatus 10 may be a personal device that is a device that is of such a size that it can be carried on a person. It may be hand-portable.

The apparatus 10 in this example comprises a display 12, a user input 16 and a controller. Implementation of the controller can be in hardware alone (e.g. a circuit, an application specific integrated circuit etc. . . . ), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (e.g. disk, memory etc) to be executed by such a processor. In the illustrated example, the controller comprises a processor 14 and a memory 18.

The processor 14 is configured to receive input commands from the user input 16 and to provide commands for controlling the display 12. The processor 14 is also configured to read from and write to the memory 18.

The display 12, processor 14, user input 16 and memory 18 are operationally coupled and any number or combination of intervening elements can exist (including no intervening elements).

The memory 18 stores a computer program 8 comprising computer program instructions that control the operation of the apparatus 10 when loaded into the processor 14. The computer program instructions provide the logic and routines that enables the apparatus to perform the methods illustrated in the Figs and provide the graphical user interface illustrated in FIG. 1. The processor 14 by reading the memory 18 is able to load and execute the computer program 8.

Figure 4:
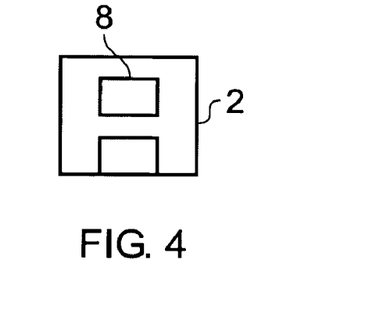
FIG. 4 schematically illustrates a computer-readable medium.

As illustrated in FIG. 4, the computer program 8 may arrive at the apparatus 10 via any suitable delivery mechanism 2. The delivery mechanism 2 may be, for example, a computer-readable storage medium, a computer program product, a memory device, a record medium such as a CD-ROM or DVD, an article of manufacture that tangibly embodies the computer program 8. The delivery mechanism may be a signal configured to reliably transfer the computer program. The apparatus 10 may propagate or transmit the computer program 8 as a computer data signal.

The memory 18 also stores data 9 of different data types. A data type may be identified by a format that enables its use in particular applications. Typical data types include, for example, data for contacts, data for photos, data for calendar, data for videos and data for music.

The memory 18 may also stores a native data structure 6 and an acquired data structure 4 that control the appearance of the graphical user interface 40 and record changes a user may make to the appearance of the graphical user interface. The appearance of the graphical user interface controls the direction(s) of transfer of identified data types.

Although the memory 18 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 1:
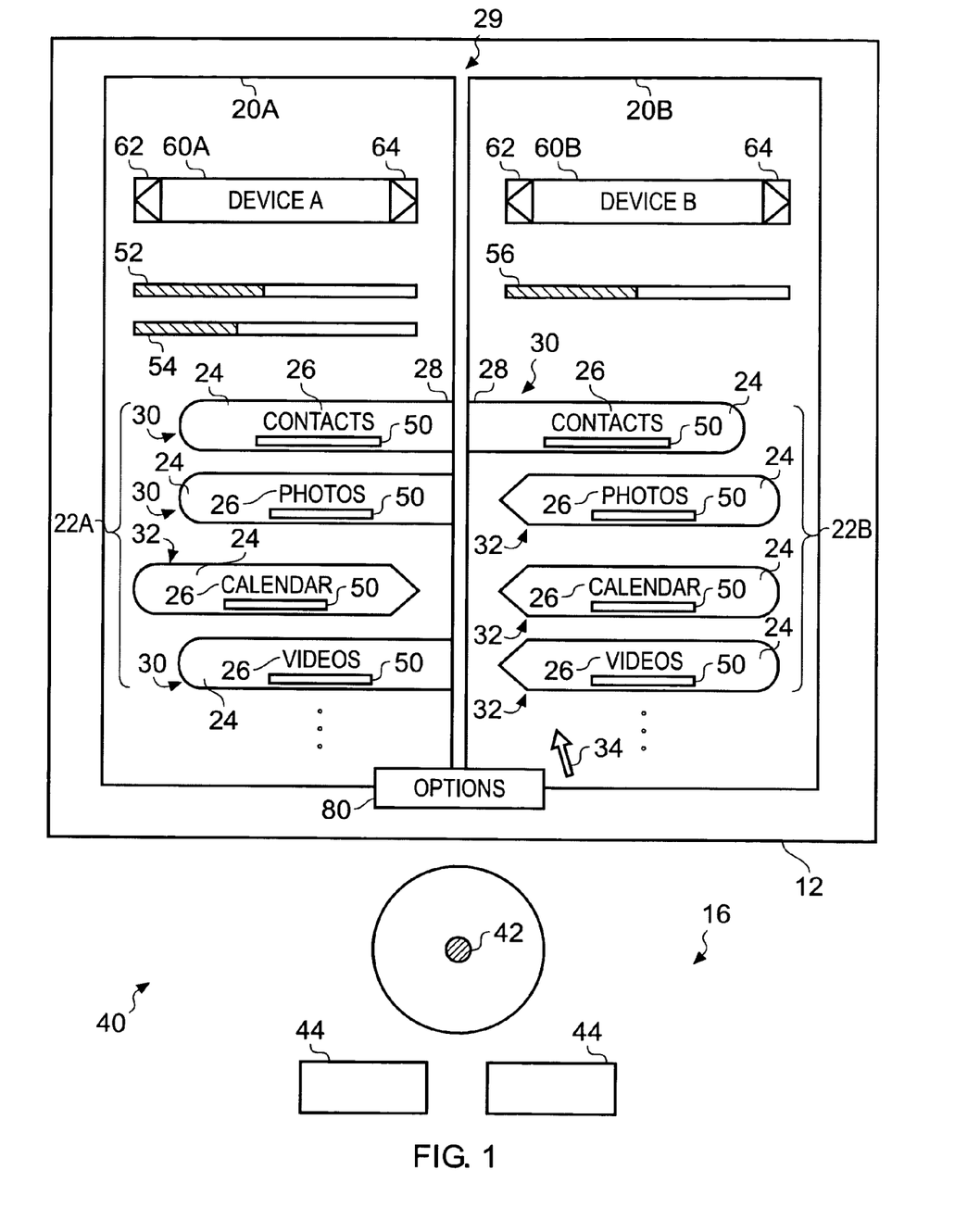
FIG. 1 schematically illustrates a graphical user interface for controlling transfer of data to and from an apparatus.

An example of a graphical user interface (GUI) 40 is schematically displayed in FIG. 1. The GUI 40 comprises the display 12 and user input 16.

In this example, the display 12 is divided into a first portion 20A and a second portion 20B. In the illustrated example, the second portion 20B is adjacent the first portion 20A but is separated from the first portion 20A by a narrow interface region 29.

The first portion 20A is used to control the transfer of data from a first device to a second device. The identity of the first device is identified in the field 60A and the identity of the second device is identified in field 60B. The first device and the second device may any suitable devices. A suitable device may, for example, be a mobile personal device, a personal computer device, a server. Typically the first device is a mobile personal device and the second device is one of a mobile personal device, a personal computer device, and a server.

The first portion 20A comprises a first ordered list 22A of graphical icons 24 which is used to control the transfer of different data types from the first device. Each graphical icon 24 in the list 22A is associated with a different data type and comprises a data type indicator 26 indicative of the associated data type.

The second portion 20B is used to control the transfer of data from the second device. The identity of the second device is identified in the field 60B. The second portion 20B comprises a second ordered list 22B of graphical icons 24 which is used to control the transfer of different data types from the second device. The second ordered list 22B of graphical icons 24 has the same ordering as the first ordered list 22A of graphical icons 24. Each graphical icon 24 in the second list 22B is associated with a different data type and comprises a data type indicator 26 indicative of the associated data type.

The graphical icons 24 of the first list 22A and the graphical icons 24 of the second list 22B are arranged in pair-wise combinations 28 that share the same data type. The graphical icons 24 in a pair 28 oppose each other across the interface 29. They are in register but separated by the interface 29.

In the illustrated example, the first portion 20A is to the left, the second portion 20B is to the right, the first list 22A extends downwards on the left of the interface 29 and the second list 22B extends downwards on the right of the interface 29 and in register with the first list 22A such that the graphical icons in each pair 28 oppose each other across the interface 29.

In the illustrated example, the different data types represented include data for contacts, data for photos, data for calendar and data for video. Additional data types such as data for music may be added and existing data types may be removed as described below.

The user input 16 may be any suitable user input. In the illustrated example, the user input 16 comprises a joystick 42 for positioning a cursor 34 within the display 12 and selection buttons 44 for selecting an item positioned under the cursor 34. The joystick 42 and selection buttons 44 therefore operate in a manner similar to a computer mouse or computer touchpad.

The user is able to change the identity of the first device using the field 60A as a first device selector. In this example, there is a predefined list of possible devices and the user scrolls the predefined list to the left using the scroll left button 62 and scrolls the predefined list to the right using the scroll right button 64.

The user may be able to change the identity of the second device using the field 60B as a second device selector. In this example, there is a predefined list of possible devices and the user scrolls the predefined list to the left using the scroll left button 62 and scrolls the predefined list to the right using the scroll right button 64.

The appearance of a graphical icon 24 for a data type is indicative of the transfer status for that data type. If the graphical icon 24 for a data type has a first visual configuration 30 (FIG. 2A) it is indicative of an enabled transfer status for that data type. If the graphical icon 24 for a data type has a second visual configuration 32 (FIG. 2B) it is indicative of a disabled transfer status for that data type. The location of a graphical icon 24 in the first list 22A or the second list 22B indicates the source of the data transfer.

Thus referring to FIG. 1, transfer from Device A (to device B) is enabled for contacts, photos and videos and disabled for calendar. Transfer from Device B (to device A) is enabled for contacts and disabled for photos calendar and videos. In the example of FIG. 1, the shape and position of a graphical icon is used to identify its configuration. In the first configuration, the graphical item 24 is positioned abutting the interface 29 whereas in the second configuration, the graphical icon 24 is positioned so that there is a gap between the graphical icon 24 and the interface 29.

Figure 2A:
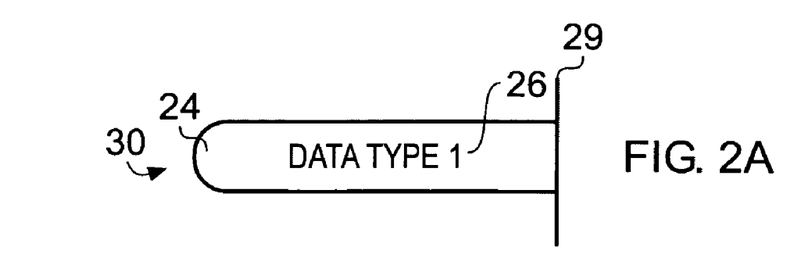
FIGS. 2A and 2B schematically illustrated different configurations of a graphical icon.
Figure 2B:
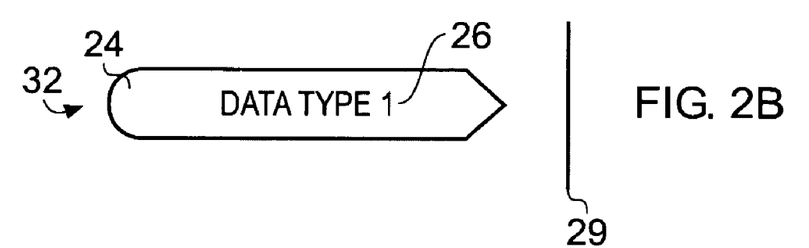

A graphical icon 24 is user configurable to have either a first visual configuration 30 that indicates enabled transfer of the data type indicated 26 by the icon 24 or a second visual configuration 32 that indicates disabled transfer of the data type indicated 26 by the icon 24. The graphical icon 24 may, for example, be moved between the different configurations by selecting the graphical icon 24 using the user input 16 and moving the graphical icon. Moving and placing a graphical icon 24 so that it abuts the interface 29 as illustrated in FIG. 2A enables data transfer for the data type indicated 26 by the graphical icon 24. Moving and placing a graphical icon 24 so that it no longer abuts the interface 29 as illustrated in FIG. 2B disables data transfer for the data type indicated 26 by the graphical icon 24.

An options button 80 is provided. If selected using the user input 16, a user may add and remove graphical items from the lists 22A, 22B. The user may, for example, be able to add a new data type such as data for music. The addition of this data type would automatically introduce a new pair 28 of graphical icon 24—one to the first list 22A and another corresponding graphical icon 24 to the second list 22B.

In this example, the user is therefore able to simply control the transfer of data to and from an apparatus 10 by controlling the appearance of the GUI 40. Likewise, in this example, the appearance of the GUI 40 immediately visually informs a user of the transfer settings for the apparatus 10. It is immediately apparent which of the two devices act as sources for the respective data types.

The settings that determine the appearance of the GUI 40 may be stored in a native data structure 6 and in an acquired data structure 4. The native data structure 6 is associated with the apparatus 10 (e.g. Device A) and records transfer status and transfer information relating to the transfer of data types from the apparatus. The native data structure 6 determines the appearance of the first list 22A of graphical icons 24. The acquired data structure 4 is associated with a remote apparatus (e.g. Device B) and records transfer status and information relating to the transfer of data types from that apparatus to the apparatus 10. The acquired data structure 4 determines the appearance of the second list 22B of graphical icons 24.

Figure 5:
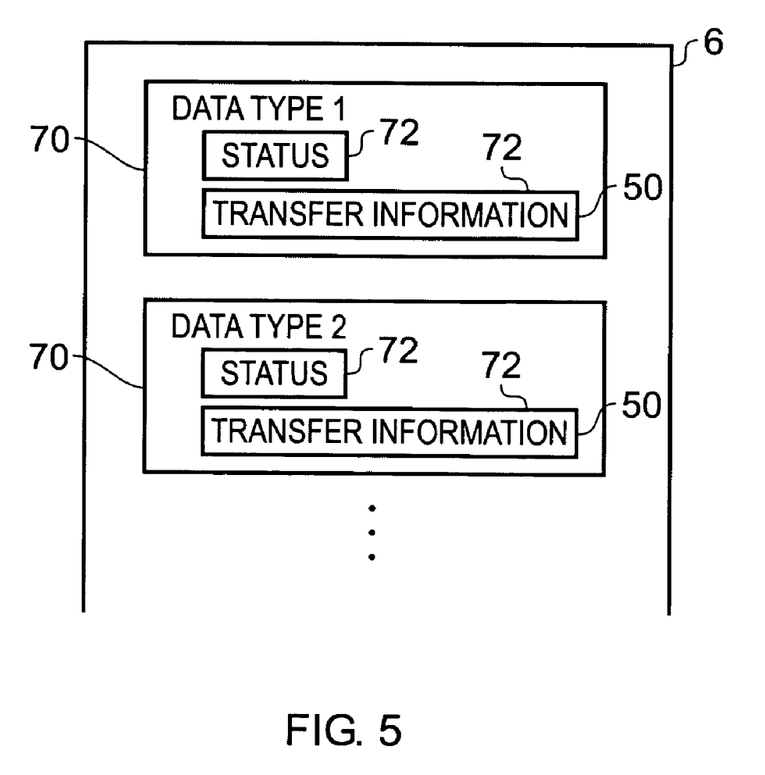
FIG. 5 schematically illustrates a data structure.

FIG. 5 schematically illustrates a data structure. In the illustrated example, the data structure is the native data structure 6. However, the acquired data structure 4 may have similar components.

Figure 6A:
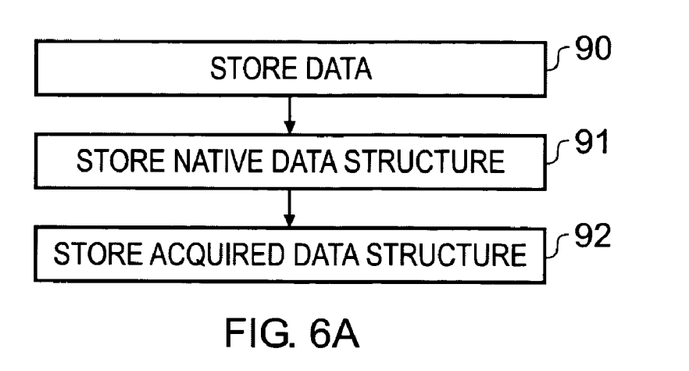
FIGS. 6A-D schematically illustrate methods for processing data structures.

As schematically illustrated in FIG. 6A, the apparatus 10 stores data 9 having different data types at block 90. It stores the native data structure 6 at block 91 and stores the acquired data structure 4 at block 92.

A data structure comprises a record 70 for each data type. Each record comprises a plurality of fields 72 including a field 72 that records a transfer status (i.e. enabled or disabled) and a field 72 that records transfer information 50.

The transfer information 50 may, for example, include information recording the time of the last transfer from the apparatus for the present data type, the number of new data items for transfer from the apparatus for the present data type, the size of new data items for transfer from the apparatus for the present data type, access references for accessing in the memory 18 the new data items of the present data type for transfer from the apparatus.

Referring back to FIG. 1 and FIG. 5, the status field 72 of a record 70 for a particular data type in the native data structure 6 determines the visual configuration of the graphical icon 24 for that data type in the first list 22A and some or all of the transfer information 50 for the same record may be displayed within that graphical icon 24. The status field 72 of a record 70 for a particular data type in the acquired data structure 4 determines the visual configuration of the graphical icon 24 for that data type in the second list 22B and some or all of the transfer information 50 for the same record may be displayed within that graphical icon 24.

Figure 6B:
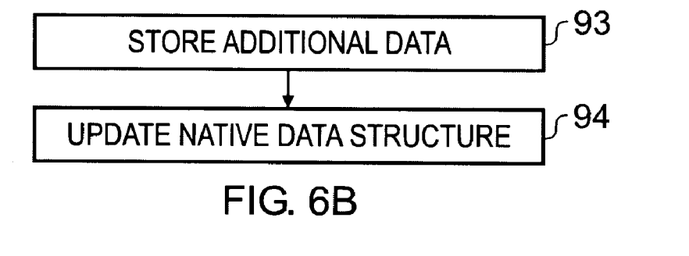

Referring to FIG. 6B, as additional data is stored on the apparatus 10 at block 93, the transfer information 50 in the native data structure 6 is no longer up to date. At block 94, the transfer information 50 in the native data structure 6 is updated to take account of the additional data.

Figure 6C:
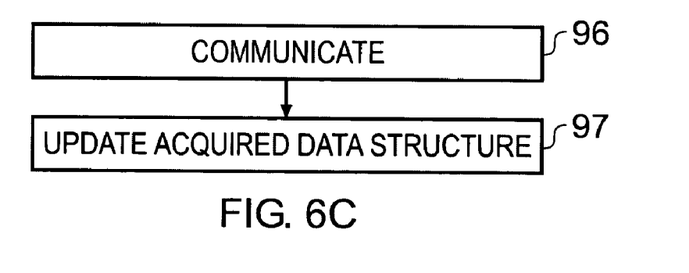

Referring to FIG. 6C, as additional data is stored on the remote apparatus the transfer information 50 in the acquired data structure 4 is no longer up to date. At block 96, the apparatus 10 communicates with the remote apparatus. At block 97, the apparatus 10 acquires transfer information 50 from the remote apparatus and updates the transfer information 50 in the acquired data structure 4.

Figure 6D:
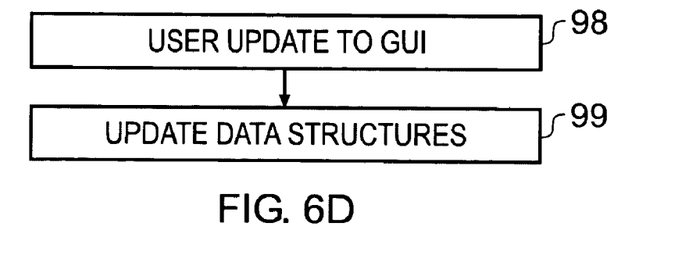

As schematically illustrated in FIG. 6D, at block 98 the appearance of the GUI 40 is adapted by a user. For example, the user may change the configuration of a graphical icon 24 in the first list 22A for a first data type from the second configuration 32 to the first configuration 30. This changes the transfer status from disabled to enabled.

At block 99, the apparatus 10 updates the native data structure 6. It accesses the record 70 for the first data type and updates the status field 72 to 'enabled'.

As another example, the user may change the configuration of a graphical icon 24 in the second list 22A for a second data type from the second configuration 32 to the first configuration 30. This changes the transfer status from disabled to enabled.

At block 99, the apparatus 10 updates the acquired data structure 4. It accesses the record 70 for the second data type and updates the status field 72 to 'enabled'.

Referring back to FIG. 1, a first memory available indicator 52 in the first portion 20A of the display 12 may indicate the amount of memory available for use in a first memory of the apparatus 10 and a second memory available indicator 54 in the first portion 20A of the display 12 may indicate the amount of memory available for use in a second memory of the apparatus 10. A third memory available indicator 56 in the second portion 20B of the display 12 may indicate the amount of memory available for use in a memory of the remote apparatus.

The blocks illustrated in the Figs may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, a user of an apparatus 10 may control, via a graphical user interface, the transfer of data to and from the apparatus 10 and one or more other devices.

The apparatus 10 may, for example in one implementation, transfer data between the apparatus 10 and N multiple other devices as a series of distinct bi-directional transactions between the apparatus 10 and a single apparatus, where the identity of the single apparatus changes with each transaction. The graphical user interface for this one device to N device transfer may be comprised of N graphical user interfaces 40, where each of the N graphical user interfaces 40 controls one of the transfer transactions. Each of the N graphical user interfaces 40 could be similar to the user interface 40 illustrated in FIG. 1.

The apparatus 10 may, for example in another implementation, transfer data between the apparatus 10 and N multiple other devices. The transfer may comprise a transfer from the apparatus 10 to the N devices and individual specified transfers from each of the N devices to the apparatus 10. The graphical user interface for this 1-N transfer may be similar to the graphical user interfaces 40 of FIG. 1, except that the display 12 is divided into a first portion 20A and into N second portions 20B. The first portion 20A is used to control the transfer of data from a first device to N second devices. The same transfer occurs for each of the N devices. The first portion 20A comprises a first ordered list 22A of graphical icons 24 which is used to control the transfer of different data types from the first device as described in relation to FIG. 1

Each of the N second portions 20B is used to control the transfer of data from a specified one of the N devices to the first device. A second portion 20B comprises a second ordered list 22B of graphical icons 24 which is used to control the transfer of different data types from the specified second device as described in relation to FIG. 1.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising at least one processor and at least one memory including computer program instructions, the at least one memory and the computer program instructions configured to, with the at least one processor, cause the apparatus at least to:

control a display to:

display a first ordered list of first graphical icons in a first portion of the display, wherein each first graphical icon represents and indicates a different data type and wherein each first graphical icon is user configurable to have either a first visual configuration that indicates that transfer from a first storage device of the data type indicated by the first graphical icon is enabled or a second visual configuration that indicates that transfer from the first storage device of the data type indicated by the first graphical icon is disabled, display a second ordered list of second graphical icons in a second portion of the display, wherein each second graphical icon represents and indicates a different data type and wherein each second graphical icon is user configurable to have either a first visual configuration that indicates that transfer from a second storage device of the data type indicated by the second graphical icon is enabled or a second visual configuration that indicates that transfer from the second storage device of the data type indicated by the second graphic icon is disabled, and wherein the second portion of the display is adjacent to the first portion of the display, the ordering of the first graphical icons in the first ordered list and the ordering of the second graphical icons in the second ordered list are the same and the first graphical icons of the first ordered list and the second graphical icons of the second ordered list form pairs of graphical icons for different data types, wherein each pair of graphical icons includes a first graphical icon from the first ordered list and a second graphical icon from the second ordered list that represent and indicate a same data type; and control transfer of a data type from the first storage device by changing the visual configuration of the first graphical icon in the first ordered list of graphical icons that represents and indicates that data type; and control transfer of a data type from the second storage device by changing the visual configuration of the second graphical icon in the second ordered list of graphical icons that represents and indicates that data type.

2. An apparatus as claimed in claim 1, wherein the apparatus is caused to:

specify a new data type; and respond to the specification of a new data type by adding a new pair of graphical icons, wherein a given first graphical icon in the new pair is added to the first ordered list and a given second graphical icon in the new pair is added to the second ordered list.

3. An apparatus as claimed in claim 1, wherein the first portion is to the left, the second portion is to the right, the first list extends downwards and the second list extends downwards in register with the first list.

4. An apparatus as claimed in claim 1, wherein the data types represented in the first and second lists comprise a plurality of data types selected from: data for contacts; data for photos; data for calendars; data for videos; and data for music.

5. An apparatus as claimed in claim 1, wherein the first and second visual configurations are distinguished by different graphical icon shapes.

6. An apparatus as claimed in claim 1, wherein the first and second visual configurations are distinguished by different graphical icon positions.

7. An apparatus as claimed in claim 6, wherein the first portion of the display is separated from the second portion of the display by an interface, wherein in the first configuration a graphical icon abuts against the interface, and in the second configuration the graphical icon does not abut the interface but is spaced from the interface.

8. An apparatus as claimed in claim 7, wherein the apparatus is caused to control a visual configuration of a graphical icon by enabling movement of the graphical icon.

9. An apparatus as claimed in claim 6, wherein the apparatus is caused to control a visual configuration of a graphical icon by enabling movement of the graphical icon.

10. An apparatus as claimed in claim 1, wherein apparatus is caused to control selection of the first storage device.

11. An apparatus as claimed in claim 1, wherein the apparatus is caused to maintain one or more data structures determining at least the first list of graphical icons and the second list of graphical icons.

12. An apparatus as claimed in claim 11, wherein a data structure indicates for each of a plurality of data types: details of data waiting for transfer and a transfer status indicative of whether transfer of that data type is enabled or disabled.

13. A method comprising:
controlling displaying, in a first portion of a display, of a first ordered list of first graphical icons wherein each graphical icon represents and indicates a different data type, and wherein each first graphical icon is user configurable to have either a first visual configuration that indicates that transfer from a first storage device of the data type indicated by the first graphical icon is enabled or a second visual configuration that indicates that transfer from the first storage device of the data type indicated by the first graphical icon is disabled;
controlling displaying, in a second portion of the display adjacent the first portion of the display, of a second ordered list of second graphical icons having the same ordering as the first ordered list of first graphical icons, wherein each second graphical icon of the second ordered list represents and indicates a different data type, and
wherein each second graphical icon is user configurable to have either a first visual configuration that indicates that transfer from a second storage device of the data type indicated by the second graphical icon is enabled or a second visual configuration that indicates that transfer from the second storage device of the data type indicated by the second graphical icon is disabled, the first graphical icons of the first ordered list and the second graphical icons of the second ordered list forming pairs of graphical icons for different data types, wherein each pair of graphical icons includes a first graphical icon from the first ordered list and a second graphical icon from the second ordered list that represent and indicate a same data type;
receiving input to change the visual configuration of the first graphical icon in the first ordered list of graphical icons representing and indicating a first data type to control transfer of the first data type from the first storage device; and
receiving input to change the visual configuration of the second graphical icon in the second ordered list of graphical icons representing and indicating a second data type to control transfer of the second data type from the second storage device.

14. A method as claimed in claim 13, further comprising directing responding to a specification of a new data type by adding a new pair of graphical icons, wherein a first given graphical icon in the new pair is added to the first ordered list and a second given graphical icon in the new pair is added to the second ordered list.

15. A method as claimed in claim 13, wherein the first and second visual configurations are distinguished by different graphical icon positions.

16. A method as claimed in claim 15, wherein the first portion of the display is separated from the second portion of the display by an interface, wherein in the first configuration a graphical icon abuts against the interface and in the second configuration the graphical icon does not abut the interface but is spaced from the interface.

17. A method as claimed in claim 13, further comprising maintaining one or more data structures that determine at least the first list of graphical icons and the second list of graphical icons.

18. A non-transitory computer readable medium tangibly embodying a program comprising instructions which, when executed by a processor, causes an apparatus to:
control displaying, in a first portion of the display, of a first ordered list of first graphical icons, wherein each first graphical icon represents and indicates a different data type, and wherein each first graphical icon is user configurable to have either a first visual configuration that indicates that transfer from a first storage device of the data type indicated by the first graphical icon is enabled or a second visual configuration that indicates transfer from the first storage device of the data type indicated by the first graphical icon is disabled;
control displaying, in a second portion of the display adjacent the first portion of the display, of a second ordered list of second graphical icons having the same ordering as the first ordered list of first graphical icons, wherein each second graphical icon of the second ordered list represents and indicates a different data type, and wherein each second graphical icon is user configurable to have either a first visual configuration that indicates that transfer from a second storage device of the data type indicated by the second graphical icon is enabled or a second visual configuration that indicates that transfer from the second storage device of the data type indicated by the second graphical icon is disabled,
wherein the graphical icons of the first ordered list and of the second ordered list form pairs of graphical icons for different data types, wherein each pair of graphical icons includes a first graphical icon from the first ordered list and a second graphical icon from the second ordered list that represent and indicate the same data type;
receiving input to change the visual configuration of the first graphical icon in the first ordered list of graphical icons representing and indicating a first data type to control transfer of the first data type from the first device; and
receiving input to change the visual configuration of the second graphical icon in the second ordered list of graphical icons representing and indicating a second data type to control transfer of the second data type from the second device.

* * * * *

UNITED STATES PATENT AND TRADEMARK OFFICE
CERTIFICATE OF CORRECTION

PATENT NO. : 8,255,808 B2
APPLICATION NO. : 12/316486
DATED : August 28, 2012
INVENTOR(S) : Lindgren et al.

Page 1 of 1

It is certified that error appears in the above-identified patent and that said Letters Patent is hereby corrected as shown below:

<u>Title page,</u>
Item (57) ABSTRACT,
Lines 13 and 14, "graphical icons that represents and indicates" should read
--graphical icons that represent and indicate--.

Signed and Sealed this
Thirtieth Day of April, 2013

Teresa Stanek Rea
*Acting Director of the United States Patent and Trademark Office*